United States Patent Office 2,764,231
Patented Sept. 25, 1956

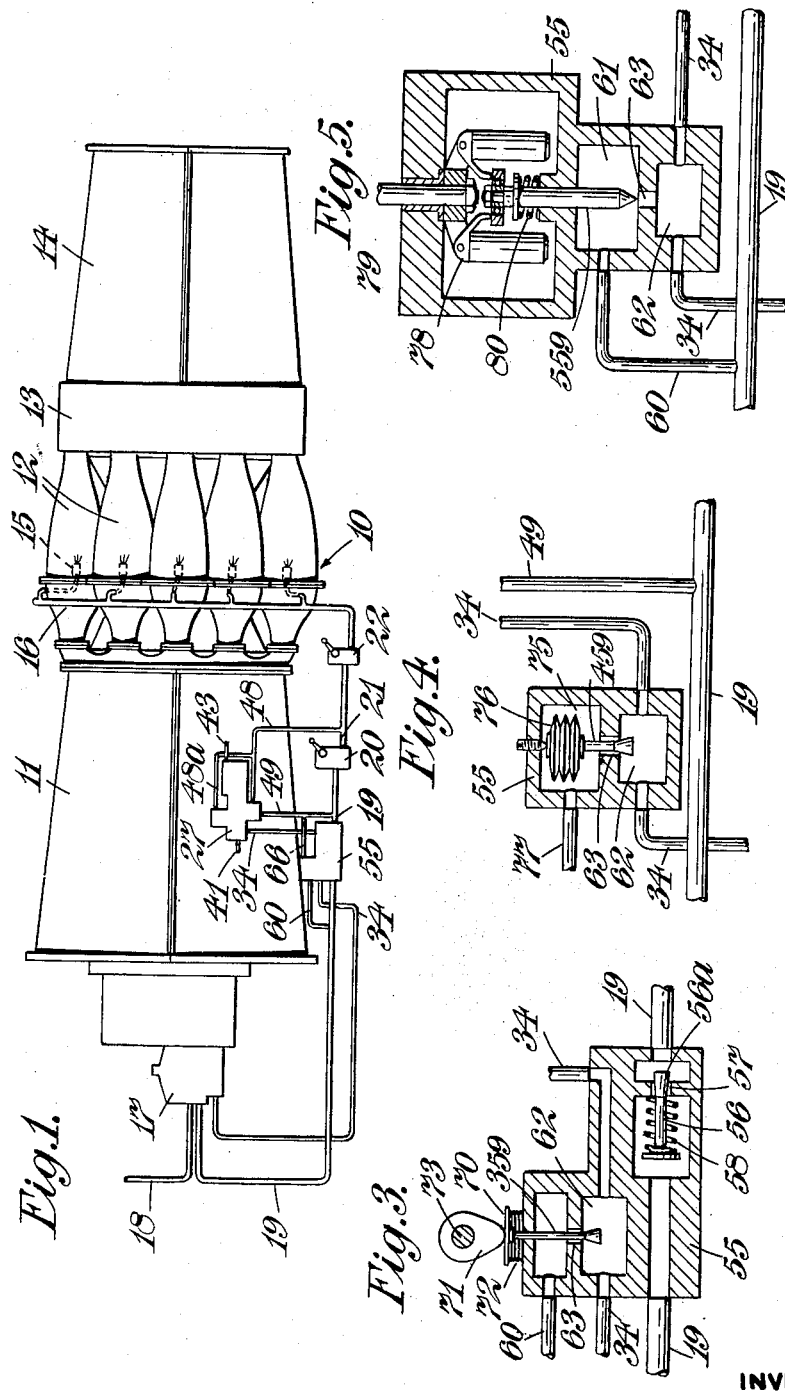

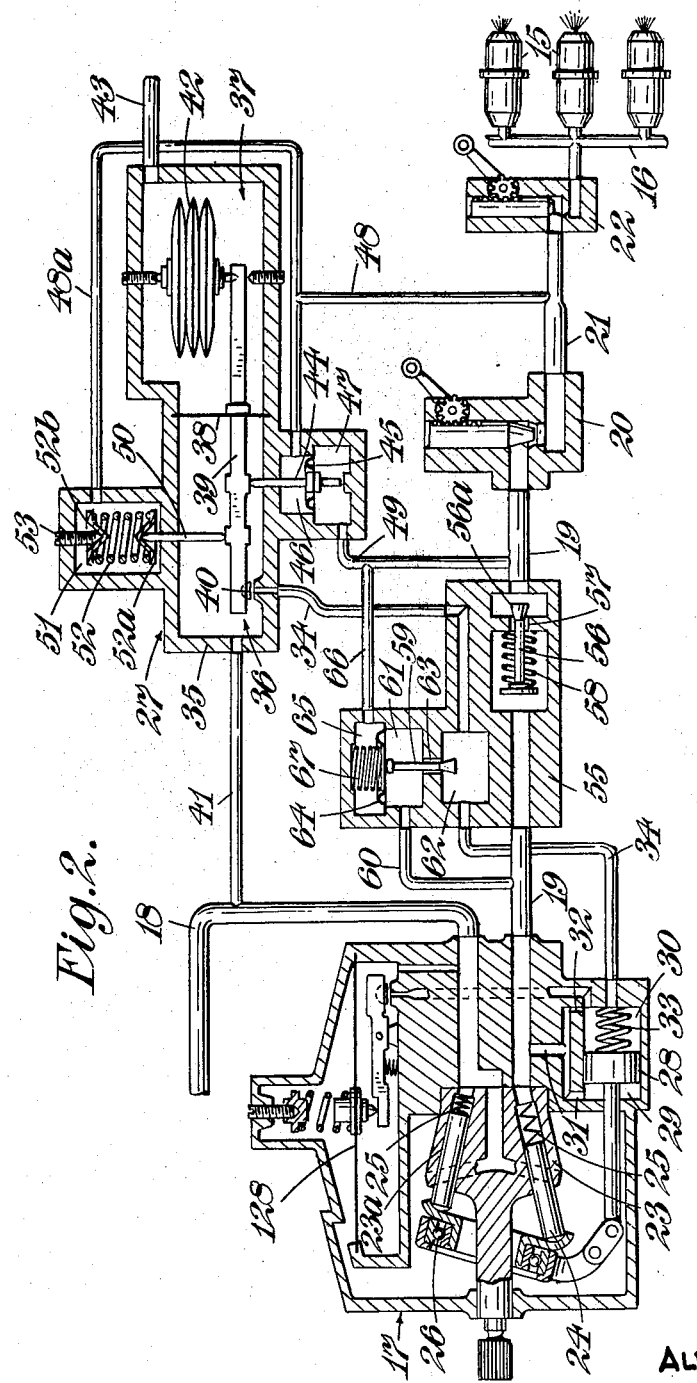

2,764,231

GAS-TURBINE ENGINE FUEL SYSTEM HAVING A VARIABLE DELIVERY PUMP AND MEANS TO CONTROL THE FUEL DELIVERY

Albert Jubb, Buttershaw, Bradford, England, assignor to Rolls-Royce Limited, Derby, England, a British company Application May 15, 1950, Serial No. 162,012

Claims priority, application Great Britain May 31, 1949

10 Claims. (Cl. 158—36.4)

This invention relates to gas-turbine engine fuel-systems, and is particularly concerned with that type of fuel system (hereinafter referred to as a fuel system of the type specified) including a variable-delivery fuel pump arranged to deliver fuel through throttle or equivalent flow control means to fuel injection devices in the combustion system of the engine, and in which the delivery of the pump is adjusted by a piston and cylinder or equivalent pressure-sensitive device arranged to be sensitive to the pressure of a servo-fluid.

The present invention has for an object to provide improved means for regulating the pressure of the servo-fluid to which the piston and cylinder or equivalent pressure-sensitive device is sensitive, for the purpose of controlling the engine in a desirable manner.

According to the present invention, a gas-turbine engine fuel-system of the type specified comprises the combination with means to effect a first servo-fluid supply at a controlled pressure to a pressure space of said piston and cylinder or equivalent pressure-sensitive device, of a controllable valve device to admit a second servo-fluid supply to said pressure space to increase the servo pressure acting in the pressure space to a value in excess of the controlled pressure. The controllable valve device may be manually controlled or may be operated automatically on attainment of a selected condition related to the running of the engine.

The controllable valve device may be actuated in accordance with a variety of conditions, preferably predetermined conditions related to the running of the engine. For example, in one preferred arrangement, the controllable valve device is operated to admit additional pressure fluid to the pressure space, thereby to increase the servo pressure and to tend to increase the stroke of the pump, so as to maintain a predetermined minimum flow of fuel to the engine.

One application of the invention is to gas-turbine engine fuel-systems of the type specified in which said means to effect a first servo-fluid supply comprises restricted orifice means connected with the fuel pump delivery and outflow metering means arranged in series with said restricted orifice means so that fuel flowing from the pump delivery through said restricted orifice means also flows through said outflow metering means, and a control to adjust said outflow metering means so that the pressure intermediate said restricted orifice means and said outflow metering means is less than the fuel delivery pressure and is dependent on the relative restrictions afforded by said restricted orifice means and the outflow metering means, said pressure space being connected between said restricted orifice means and said outflow metering means. In applying the invention to such a fuel-system the controllable valve device may be arranged to connect said pressure space with a source of fuel under pressure, the pressure of which is greater than the pressure intermediate said restricted orifice means and said outflow metering means, thereby to increase the servo pressure within said pressure space. In such an application of the invention, if an increase in the servo pressure in said pressure space results in increase of the delivery of the fuel pump, the introduction of the additional pressure fluid through the controllable valve device into the pressure space increases the delivery of the pump for a given rotational speed of the pump to an amount above that which would be allowed in normal operation by said restricted orifice means and the outflow metering means.

Some arrangements according to this invention will now be described as applied in a fuel system of a simple jet-propulsion gas-turbine engine.

The description makes reference to the accompanying diagrammatic drawings in which:

Figure 1 illustrates diagrammatically a simple gas-turbine engine and its fuel system, Figure 2 illustrates one embodiment of a fuel system in greater detail, Figure 3 illustrates a modification of the fuel system, Figure 4 illustrates another embodiment of the fuel system, and Figure 5 illustrates yet another modification of the fuel system.

Referring to Figure 1, there is illustrated a gas-turbine engine 10 suitable for propelling an aircraft by jet reaction and comprising a compressor 11 illustrated as an axial-flow compressor, combustion equipment comprising a plurality of separate combustion chambers 12 which combustion chambers are connected to receive compressed air from the compressor 11, a turbine 13 which is connected to receive heated gases from the combustion chambers 12 and is arranged to drive the compressor 11, and an exhaust assembly 14 to which may be connected a jet-pipe with a jet-propulsion nozzle (not shown).

Fuel is burnt in the compressed air delivered to the combustion chambers 12 and the fuel is delivered into the combustion chambers through injection devices 15 which may be of any suitable or convenient kind and which may, as shown, be supplied with fuel from a manifold 16.

The fuel system for supplying fuel to the manifold 16 is of the kind comprising a variable-delivery pump 17 which is engine driven and is arranged to draw in fuel through a suction pipe 18 from a reservoir (not shown) and deliver fuel into a pipe-line 19 leading to a throttle 20. The outlet side of the throttle 20 is connected by a pipeline 21 to a shut-off cock 22, the outlet side of which is connected to the manifold 16. The shut-off cock 22 is fully-open during running of the engine and is closed when the engine is not running.

Referring now to Figure 2, the variable-delivery pump is illustrated as being a pump of the type comprising a rotor 23 formed with a series of substantially axial bores 23a in which plungers 24 are reciprocated against the action of springs 25 by means of a swash-plate mechanism 26. The stroke of the plungers 24 in the bores 23a and thus the volumetric capacity of the pump is determined by the inclination of the swash-plate mechanism to the axis of rotation of the rotor 23, and in the arrangement illustrated the inclination of the swash-plate mechanism 26 is controlled by a servo mechanism the operation of which is controlled by a device 27 known as a "barometric flow control" which serves to vary the fuel supply to the engine in a desirable manner in accordance with variations in the atmospheric air pressure and also operates for any given atmospheric air pressure to maintain the difference in fluid pressures on each side of the throttle 20 at a predetermined value. The servo mechanism is also controlled by a mechanism 128 which operates to prevent the rotational speed of the engine from exceeding a predetermined value. This mechanism 128 is well-known in construction and operation and does not form an essential part of the control mechanism according to this invention.

The servo mechanism for controlling the angle of inclination of the swash-plate mechanism 26 comprises a piston 28 dividing a cylinder into two chambers 29 and 30. The chamber 29 is connected by a duct 31 with the delivery side of the pump 17, so that the pressure within the chamber 29 is the fuel delivery pressure in the pipeline 19. The chamber 30 is also connected to the delivery of the fuel pump 17 through the duct 31 but there is provided between the duct 31 and the chamber 30 a flow restriction 32. A spring 33 is accommodated within the chamber 30 and loads the piston 28 in a direction tending to move to the left as viewed in the drawing, that is in a direction tending to increase the stroke of the plungers 24 and thus the volumetric capacity of the fuel pump 17. The chamber 30 also has connected to it a bleed pipe 34 through which fluid can flow from the chamber 30. As is well-known, when fluid flows from the chamber 30 through the bleed pipe 34 the fluid pressure within the chamber 30 (due to the presence of the flow restriction 32) falls below the pressure in the chamber 29, so that the piston tends to be moved to the right, as viewed in the drawings, by the fluid pressure acting in the chamber 29. When there is no bleed through the bleed pipe 34 then the fluid pressures in the chambers 29 and 30 tend to equalise and the piston 28 tends to be moved by the spring 33 to the maximum stroke position for the plungers 24.

The outflow of fluid from the chamber 30 through bleed pipe 34 is controlled by the barometric flow control 27.

The barometric flow control in the arrangement illustrated comprises a body 35 which is divided into two chambers 36, 37 by means of a flexible diaphragm 38 carrying a rocking lever 39 the ends of which extend respectively into the two chambers 36 and 37. The end of the lever 39 projecting into the chamber 36 carries a half-ball valve element 40 arranged to engage on a seat surrounding the outlet from bleed pipe 34 into chamber 36, which chamber is connected by a pipe 41 to the suction pipe 18 of the fuel pump 17. When the loads acting on the lever are such as to press the half-ball valve element 40 firmly on its seat there is no leakage of fluid through the bleed pipe 34 and the stroke of the pump 17 increases, and when the loads acting on the lever 39 tend to lift the half-ball valve element 40 off its seat fluid bleeds off from the chamber 30 through the bleed pipe 34, thus reducing the stroke of the plungers 24 of the fuel pump 17.

The lever 39 is arranged to be controlled by three principal loads as follows:

(a) By a load which is dependent upon the atmospheric air pressure and which is applied to the lever 39 by means of an evacuated capsule 42 accommodated in the chamber 37 which is connected by a conduit 43 to any suitable atmospheric air point on the aircraft. As the atmospheric air pressure decreases the capsule expands and increases the load afforded by it on the lever 39. The load applied by the capsule 42 is in a direction tending the lift the half-ball valve element 40 off its seat.

(b) A load which is dependent on the difference in fuel pressures in the pipes 19 and 21 on each side of the throttle 20. This load is applied to the lever 39 in the same sense as the load applied by the capsule 42 and is applied through a tappet member 44 carried by a diaphragm 45 separating a pair of chambers 46 and 47, whereof the chamber 46 is connected by means of a pipeline 48 to the pipe-line 21 between the throttle 20 and shut-off cock 22, and whereof the chamber 47 is connected by a pipe-line 49 to the delivery pipe 19 just upstream of the throttle 20 so that the diaphragm is loaded in dependence upon the drop in pressure across the throttle 20.

(c) A spring load which opposes the loads due to the capsule 42 and the diaphragm 44. This spring load is applied to the lever 39 by means of a tappet member 50, one end of which textends into the chamber 36 and the other end of which extends into a chamber 51 accommodating a spring 52, one abutment 52a of which bears on the tappet 50 and the other abutment 52b of which bears against an adjustable set-screw 53. The chamber 51 is connected by a branch pipe 48a to the pipe-line 48, this arrangement being adopted to compensate for the difference in the effective areas of the sides of the diaphragm 45.

The operation of the barometric flow control 27 is well understood and may be briefly stated as follows. Under steady atmospheric pressure conditions an increase in the pressure drop across the throttle 20 causes an increase in the load applied to the lever 39 by the tappet 44, thereby lifting the half-ball valve 40 off its seat to permit fluid to bleed through the bleed pipe 34 from chamber 30, thereby causing a reduction in the pump stroke and in the quantity of fuel delivered to the engine. The reduction in fuel flow is such that the pressure drop across the throttle 20 decreases until the moments of the loads acting on the lever 39 balance one another.

Conversely, on decrease in the pressure drop across the throttle 20 the load applied by tappet 44 to the lever 39 decreases, permitting the half-ball valve element 40 to be pressed more firmly on its seat and preventing bleed of fluid from the chamber 30 so that the pump stroke increases until the pressure drop across the throttle 20 is again such that the moments of the loads acting on the lever 39 balance one another.

On decrease of the atmospheric air pressure the load afforded on the lever 39 by capsule 42 increases, lifting the half-ball valve element 40 off its seat and causing a reduction in the fuel pump stroke. Conversely an increase in the atmospheric air pressure causes a reduction in the load applied to the lever 39 by capsule 42 and an increase in the fuel pump stroke and fuel delivery to the engine.

Under equilibrium conditions the extent to which the valve 40 is opened differs very little from altitude to altitude so that the extent of opening of the valve 40 is substantially constant. The reason for this is as follows. The capsule 42 is in the nature of a spring and say on decrease of the atmospheric pressure the capsule tends to expand opening the valve 40; on opening of this valve the flow from the space 30 of the servo motor increases and the pressure in this space decreases so that the piston 28 moves to the right, as viewed in Figure 2 of the drawing, cutting down the stroke of the pump 17 and thus cutting down the pressure drop across the throttle valve 20 to which the diaphragm 45 responds. Thus the load applied to the lever 39 by the diaphragm 45 is cut down and so a great amount of the load due to spring 52 has to be balanced by the capsule 42 which accordingly collapses again. The net result is that at all altitudes the extent of opening of the valve 40 under equilibrium conditions is substantially the same.

With a fuel system of the class just described it may be desirable under certain operating conditions to over-ride the controlling effect of the barometric flow control 27 and for this purpose according to the present invention it is arranged that when certain conditions exist or when it is desired to over-ride the barometric flow control, the chamber 30 is supplied with fluid at a pressure which is greater than the pressure existing in the chamber 30 due to the pressure fluid supply due to the duct 31, flow restriction 32 and bleed pipe 34.

For instance, under certain circumstances it is desirable to over-ride the effect of the barometric flow control 27 to avoid the flow of fuel to the engine being reduced to below a predetermined minimum value, so that the possibility of extinction of the flame in the combustion chambers of the engine, especially at high altitudes, is avoided. In other words, in certain circumstances it is desirable to prevent the pressure of the servo fluid in the chamber 30 falling to the value to which it would otherwise be controlled by the barometric flow control 27.

To avoid the difficulty mentioned above the following arrangement is adopted. A device 55 is provided by means of which, when the fuel flow through the pipe-line 19 from the pump 17 to the throttle 20 falls to a predetermined value, a valve is opened to admit pressure fluid through the bleed pipe 34 to the chamber 30, which pressure fluid has a pressure in excess of that which would otherwise exist in the chamber 30 due to the presence of the barometric flow control 27.

The device 55 comprises a valve element 56 co-operating with a port 57 and arranged to be loaded against the fluid pressure load on it by a spring 58 which tends to cause valve element 56 to close-off the port 57. The head 56a of the valve element 56 has such a shape and the spring 58 has such a rate that the difference in pressures in the pipe-line 19 on each side of the device 55 is proportional to the fuel flow through the device.

The device 55 also comprises a valve member 59 controlling the flow of pressure fluid from a chamber 61 (which is connected by a branch pipe 60 to the fuel delivery pipe 19 upstream of the device 55) through a port 63 into a chamber 62 forming part of the bleed pipe 34. The valve member 59 is carried by a flexible diaphragm 64 which separates the chamber 61 from a further chamber 65 connected by a branch pipe 66 to the pipe-line 49 and thus to the fuel delivery pipe 19 just downstream of the device 55. The diaphragm is loaded by a spring 67 in a direction tending to move the valve member 59 to permit pressure fluid to flow through the port 63 from the delivery pipe 19 into the chamber 62, thus to increase the pressure existing in the chamber 30. It will be seen that the diaphragm 64 is subjected to a load which is dependent on the fuel flow through the pipe-line 19 and by a suitable selection of the strength of the spring 67 it can be arranged that the valve member 59 normally closes off the port 63, but that, when the fuel flow through the delivery pipe 19 falls to a predetermined value, the valve 63 opens admitting pressure fluid to the chamber 30 directly from the fuel delivery pipe 19 (thus overriding the barometric pressure control) and causing an increase in the fuel delivery.

Thus, with the arrangement just described, under normal running conditions the fuel flow through the delivery pipe 19 will be such that the load applied to the diaphragm 64 will be sufficient to overcome the spring 67 and maintain the valve 59 in a position in which the port 63 is closed, so that the barometric flow control 27 operates to control the delivery of the pump 17. However, when the fuel delivery falls to a preselected value, say under idling conditions, especially at altitude, the pressure drop across the device 55 falls to such an extent that the valve member 59 is moved under control of the spring 67 to open the port 63 to admit pressure fluid to the chamber 30, thus in effect boosting the pressure in this chamber. When this occurs the piston 28 moves to the left as seen in the drawing, increasing the stroke of the plungers 24 of the pump 17, increasing the fuel delivery of the pump 17 and increasing the pressure drop across the device 55. Thus the fuel flow to the engine will tend to stabilize at the predetermined minimum value.

Referring now to Figure 3, there is shown an arrangement in which the additional pressure fluid is admitted to the chamber 62 of the device 55 by means of a valve member 359 which is manually controlled. In this arrangement the valve member 359 is carried by a member 70 displaceable by a cam 71 against the action of a spring 72. The cam 71 is carried on a shaft 73 which is manually controlled.

Such an arrangement may be useful to maintain an operating servo pressure in the chamber 30 despite failure of some other part of the normal servo pressure supply, for example on choking of the flow restriction 32.

With such an arrangement the valve mechanism 56, 56a, 57, 58 may be omitted.

Another arrangement is shown in Figure 4 and in this arrangement the device 55 is arranged so to maintain the servo pressure in the chamber 30 as to prevent the fuel pressure in the manifold 16 from falling below a predetermined value. For this purpose the device 55 comprises a valve member 459 controlling the flow of pressure fluid from a chamber 75 through the port 63 to the chamber 62. The valve member 459 is carried by an evacuated capsule 76 and the chamber 75 is connected by a pipe 77 either to the fuel manifold 16 or to the fuel pipe 21 interconnecting the throttle 20 and the shut-off cock 22, the pressure in this pipe 21 being substantially equal to the pressure in the fuel manifold 16.

In operation, when the fuel pressure in the chamber 75, that is the fuel burner pressure, exceeds a predetermined minimum value dependent on the rate of the capsule 76, the valve 459 is closed, but when the fuel burner pressuer tends to fall below the predetermined value the capsule 76 expands causing the valve member 459 to open the port 63 and permit pressure fluid to enter the chamber 62 and over-ride the barometric flow control 27.

Referring now to Figure 5, there is illustrated an arrangement in which the over-ride device 55 for the barometric flow control 27 is arranged to become operative when the engine rotational speed tends to fall below a preselected value.

In this construction the device 55 comprises a valve member 559 controlling the port 63 interconnecting chamber 61 and chamber 62 and the valve member 559 is controlled by a centrifugal governor 78 arranged to be engine-driven through shaft 79 and arranged to displace the valve member 559 against the action of a spring 80 in a direction to close off the port 63 as the engine speed increases. When the engine speed reaches the predetermined value the port 63 is completely closed by the valve member 559, so that the barometric flow control operates normally. When, however, the engine rotational speed tends to fall below the preselected value the valve member 559 opens the port 63 and permits pressure fluid to flow from the pipe-line 19 through pipe 60, chamber 61 into chamber 62 and thus to over-ride the barometric flow control 27.

I claim:

1. In a fuel system for a gas-turbine engine comprising a variable-delivery fuel pump and fuel injection devices for said engine connected to receive fuel from said pump, a control system comprising a member adapted on movement to vary the delivery from said pump; a first pressure fluid supply; an actuating member to actuate said delivery-varying member and having on one side a pressure space connected to said first pressure fluid supply whereby it is exposed on one side to servo fluid pressure and adapted on increase of the pressure in said pressure space to increase the rate of fuel delivery from said pump; means to control the servo fluid pressure in said pressure space; a second servo fluid supply; a controllable valve device operable to admit pressure fluid from said second servo fluid supply to said pressure space to increase the fluid pressure therein to a value in excess of the controlled pressure; means responsive to the rate of fuel flow from the pump to the fuel injection devices and arranged to open said controllable valve device to admit said second servo fluid supply to said pressure space when the rate of fuel flow sensed by said flow-responsive means tend to fall below a predetermined minimum value, thereby to increase the rate of fuel delivery from the pump and thus to prevent the rate of fuel flow to the fuel injection devices falling below the predetermined minimum value to prohibit flame extinction in the combustion equipment.

2. A control-system according to claim 1, wherein said means responsive to the rate of fuel flow comprises a port located to pass the fuel delivery from said pump to the fuel injection devices, a valve member co-operating with said port and arranged to be subjected to a fluid pressure load due to the fuel flow through said port in a direction tending to displace the valve member to increase the effective area of the port, resilient means to load said valve member in a direction tending to reduce the effective area of said port, said valve member having such a shape and said resilient means having such a rate that the difference in pressure on each side of said port is proportional to the fuel flow through the port, and pressure-responsive means connected to respond to the difference in fuel pressures on each side of said port and arranged by its response to said difference in pressures to adjust said controllable valve device.

3. A control system as claimed in claim 2, wherein said pressure-responsive means comprises a flexible diaphragm operating said controllable valve device and arranged to be loaded by the fuel pressures on each side of said port to tend to close said controllable valve, and spring means arranged to load said flexible diaphragm in a direction tending to open said controllable valve device.

4. A control-system as claimed in claim 1, having means to effect said first pressure-fluid supply comprising restricted orifice means connected with the fuel pump delivery and outflow metering means arranged in series with said restricted orifice means so that fuel flowing from the pump delivery through said restricted orifice means also flows through said outflow metering means which are adjustable by the means to control the servo fluid pressure in said pressure space so that the pressure intermediate said restricted orifice means and said outflow metering means is less than the fuel delivery pressure, said pressure space being connected between said restricted orifice means and said outflow metering means; and having said controllable valve device arranged to connect said pressure space directly with the fuel pump delivery.

5. In a fuel-system for a gas-turbine engine comprising a variable-delivery fuel pump and fuel injection devices for said engine connected to receive fuel from said pump, a control system comprising a member adapted on movement to vary the delivery from said pump; an actuating member to actuate said delivery-varying member; a first chamber to contain said actuating member, whereby the actuating member is subjected on one side to the pressure in said first chamber; said actuating member being adapted on increase of the pressure in said first chamber to move to increase the rate of fuel delivery from said pump; a pressure fluid supply connection to said first chamber; an output conduit from said chamber; valve means co-operating with said outlet conduit to control the fluid pressure in said chamber; pressure-sensitive means to actuate said valve means to control said fluid pressure in accordance with the pressure sensed by said pressure-sensitive means; a second chamber having a outlet orifice, said outlet orifice having communication with said first chamber; a supply connection to supply pressure fluid to said second chamber at a pressure not less than that of the pressure fluid supply to the first chamber; controllable valve means to close said outlet orifice; and means responsive to the rate of fuel flow from said pump to said fuel injection devices and arranged to open said controllable valve means to admit pressure fluid from said second chamber to said first chamber when the rate of fuel flow sensed by said means responsive to fuel flow tends to fall below a predetermined minimum value, thereby to increase the rate of fuel delivery from the pump and thus to prevent the rate of fuel flow to the fuel injection devices falling below the predetermined minimum value.

6. A control-system according to claim 5, wherein said means responsive to the rate of fuel flow comprises a port located to pass the fuel delivery from said pump to the fuel injection devices, a valve member co-operating with said port and arranged to be subjected to a fluid pressure load due to the fuel flow through said port in a direction tending to displace the valve member to increase the effective area of the port, resilient means to load said valve member in a direction tending to reduce the effective area of said port, said valve member having such a shape and said resilient means having such a rate that the difference in pressure on each side of said port is proportional to the fuel flow through the port, and pressure-responsive means connected to respond to the difference in fuel pressures on each side of said port and arranged by its response to said difference in pressures to adjust said controllable valve means.

7. A control-system as claimed in claim 6, wherein said pressure-responsive means comprises a flexible diaphragm operating said controllable valve means and arranged to be loaded by the fuel pressures on each side of said port to tend to close said controllable valve, and spring means arranged to load said flexible diaphragm in a direction tending to open said controllable valve device.

8. In a fuel system for a gas-turbine engine comprising a variable-delivery pump and fuel injection devices connected to the delivery of said pump, a control system comprising a member adapted on movement to vary the delivery from said pump; a first chamber; an actuating member to actuate said delivery-varying member, and dividing said first chamber into a first pressure space and a second pressure space; a pressure fluid supply; a first connection from said pressure-fluid supply to said first pressure space; a second connection from said supply to said second pressure space which second connection contains a restricting orifice; said actuating member being adapted to move on increase of pressure in said second pressure space to increase the rate of fuel delivery from said pump; an outlet connection from said second pressure space; valve means to control the flow of pressure fluid from said outlet connection; pressure-sensitive means to actuate said valve means to control the fluid pressure in said second pressure space in accordance with the pressure sensed by said pressure-sensitive means; a second chamber; an outlet connection from said second chamber to said second pressure space; a third connection from said pressure fluid supply to said second chamber; and a controllable valve device to control flow through said outlet connection from said second chamber to said second pressure space; and means responsive to the rate of fuel flow from the pump to said injection devices and arranged to open said controllable valve device when the rate of fuel flow tends to fall below a preselected minimum value thereby to increase the rate of fuel delivery from the pump and thus to prevent the rate of fuel flow to the fuel injection devices from falling below the preselected minimum value.

9. In a fuel system for a gas-turbine engine comprising a variable-capacity fuel pump and fuel injection devices for said engine connected to receive fuel from said pump, a control system comprising a member adapted on movement to vary the capacity of said pump; an actuating member to actuate said capacity-varying member and having on one side a pressure space whereby it is exposed on one side to servo fluid pressure and adapted on increase of the pressure in said pressure space to increase the rate of fuel delivery from said pump; means to control the servo fluid pressure to which said actuating member is exposed; controllable valve means to admit a second servo fluid supply to said pressure space to increase the servo fluid pressure therein to a value in excess of the controlled pressure; means responsive to the rate of fuel flow from the pump to the fuel injection devices and arranged to actuate said controllable valve means to admit said second servo fluid supply when the rate of fuel flow sensed by said flow-responsive means tends to fall below a predetermined minimum value, thereby to increase the rate of fuel delivery from the pump and thus to prevent the rate of fuel flow to the fuel injection devices falling below the predetermined minimum value.

10. In a fuel system for a gas-turbine engine comprising a variable delivery fuel pump and fuel injection devices for said engine connected to receive fuel from said pump, a control system comprising a delivery-varying member arranged to be adjustable to vary the delivery from said pump; a first pressure fluid supply; an actuating member to actuate said delivery-varying member and having on one side a pressure space connected to said first pressure fluid supply whereby it is exposed on one side to servo fluid pressure and adapted on increase of pressure in said pressure space to increase the rate of fuel delivery from said pump; control means to control the servo fluid pressure in said pressure space; and means to over-ride said control means including a second servo fluid supply to supply servo fluid at a higher pressure than the instantaneous controlled servo fluid pressure, a controllable valve device operable to admit pressure fluid from said second servo fluid supply to said pressure space to increase the fluid pressure therein to a value in excess of the controlled servo fluid pressure, means responsive to the rate of fuel flow from the pump to the fuel injection devices and connected to said controllable valve device to load it in the sense of closure, and resilient means to load said controllable valve device in the sense of opening, whereby said controllable valve device is opened to admit pressure fluid from said second pressure fluid supply to said pressure space when the rate of fuel flow tends to fall below a preselected minimum value, thereby to increase the rate of fuel delivery from the pump and thus to prevent the rate of fuel flow to the fuel injection devices falling below the preselected minimum value.

References Cited in the file of this patent

UNITED STATES PATENTS

| | | |
|---|---|---|
| 2,424,035 | Ifield | July 15, 1947 |
| 2,536,556 | Lawrence | Jan. 2, 1951 |

FOREIGN PATENTS

| | | |
|---|---|---|
| 580,149 | Great Britain | Aug. 8, 1946 |